United States Patent
Cecchin et al.

(10) Patent No.: US 7,005,099 B2
(45) Date of Patent: Feb. 28, 2006

(54) METHOD OF FORMING AN INTERIOR TRIM COMPONENT

(75) Inventors: Euclide Cecchin, Windsor (CA); Helmut Nicolaus Fichtenthal, Kerzers (CH); Joseph Omar Syed, La Salle (CA); Mario DiBartolomeo, Amherstburg (CA); Dave Armstrong, La Salle (CA); Doug Wilson, Burlington (CA)

(73) Assignee: Globaltex 2000, Ltd., Windsor (CA)

( * ) Notice: Subject to any disclaimer, the term of this patent is extended or adjusted under 35 U.S.C. 154(b) by 84 days.

(21) Appl. No.: 10/285,259

(22) Filed: Oct. 31, 2002

(65) Prior Publication Data
US 2003/0080466 A1 May 1, 2003

Related U.S. Application Data

(60) Provisional application No. 60/336,369, filed on Oct. 31, 2001.

(51) Int. Cl.
*B29C 45/14* (2006.01)
*B29C 65/70* (2006.01)

(52) U.S. Cl. ...................... 264/258; 264/259

(58) Field of Classification Search ................ 264/258, 264/259, 261, 263, 266, 267, 273, 274, 275, 264/277; 442/117, 136, 149; 428/304.4, 428/306.6; 156/242
See application file for complete search history.

(56) References Cited

U.S. PATENT DOCUMENTS

| | | | |
|---|---|---|---|
| 4,259,274 A | 3/1981 | Tiitola | |
| 4,432,822 A | 2/1984 | Adams et al. | |
| 4,445,954 A * | 5/1984 | Adams et al. | 156/148 |
| 4,508,499 A | 4/1985 | Spengler | |
| 5,230,844 A | 7/1993 | Macaire et al. | |
| 5,453,240 A | 9/1995 | D'Hooren | |
| 5,565,259 A | 10/1996 | Juriga | |
| 5,582,906 A | 12/1996 | Romesberg et al. | |
| 5,614,285 A | 3/1997 | Gardill | |
| 5,709,925 A | 1/1998 | Spengler et al. | |
| 5,718,791 A | 2/1998 | Spengler | |
| 5,756,406 A * | 5/1998 | Rittman et al. | 442/117 |
| 5,925,207 A | 7/1999 | Itoh et al. | |
| 5,942,321 A | 8/1999 | Romesberg et al. | |
| 6,165,404 A * | 12/2000 | Savonuzzi | 264/266 |
| 6,231,940 B1 * | 5/2001 | Aichner et al. | 428/36.2 |
| 6,287,678 B1 | 9/2001 | Spengler | |
| 6,447,706 B1 * | 9/2002 | Savonuzzi | 264/266 |

FOREIGN PATENT DOCUMENTS

EP     0482270     4/1992

* cited by examiner

Primary Examiner—Angela Ortiz
(74) Attorney, Agent, or Firm—Howard & Howard

(57) ABSTRACT

An interior trim component is formed utilizing an injection molding apparatus having first and second molds. The component includes a laminate and a polymer. The laminate includes a face layer having a finished and unfinished side, an adhesive layer bonded to the unfinished side, and a barrier bonded to the adhesive layer. The barrier includes a nonwoven textile weighing at least 80 g/m². The laminate is positioned in the first mold such that the barrier is exposed to face the second mold. The apparatus is moved into a closed position and a cavity is established between the barrier and the second mold. The polymer is injected into the cavity at a pressure of at least 500 psi. The polymer reacts with the barrier to bond the laminate to the polymer and to form the interior trim component without the polymer penetrating through the barrier and into the face layer.

10 Claims, 5 Drawing Sheets

FIG - 1A
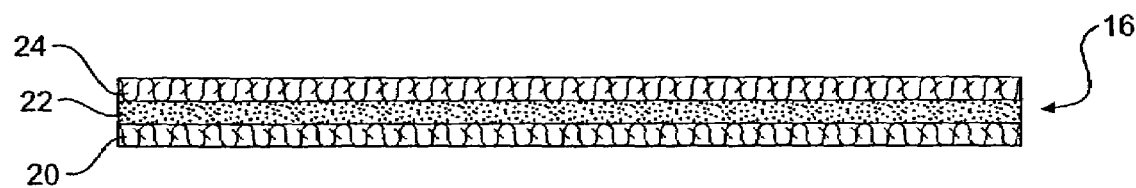
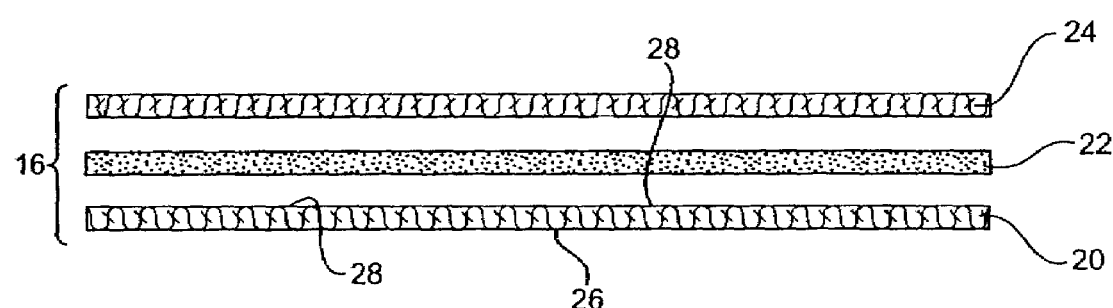
FIG - 1B
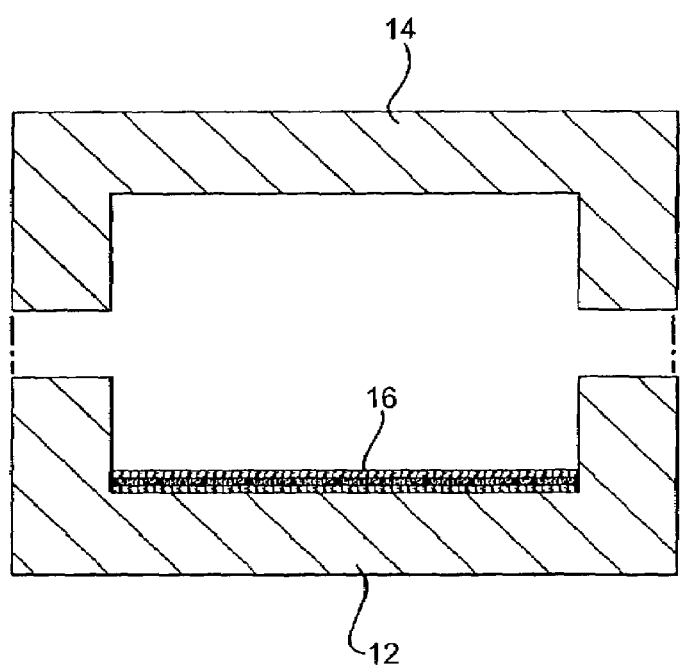
FIG - 2A

METHOD OF FORMING AN INTERIOR TRIM COMPONENT

RELATED APPLICATIONS

This patent application claims priority to and all advantages of U.S. Provisional Patent Application No. 60/336,369, which was filed on Oct. 31, 2001.

FIELD OF THE INVENTION

The subject invention generally relates to a method of forming an interior trim component for use in a passenger compartment of a vehicle or truck.

BACKGROUND OF THE INVENTION

Laminates are often used in the automotive industry for interior trim components such as armrests, consoles, headrests, pillars, and vehicle seats. A typical lamination process uses a flat bed laminator in conjunction with a continuous belt conveyor to form the laminate. Layers of materials that are to be laminated are fed to the laminator by the conveyor. The laminate is formed when the laminator heats the layers of materials, applies pressure to bond these layers together, and then cools the bonded layers.

Current processes require that the laminate first be created and then die cut to a particular contour to fit a particular interior trim component, such as an A pillar. Separately, an interior of the component is injection molded, and then the laminate is tightly wrapped and stitched, stapled, or glued about the interior to form the component. In other words, in the prior art, a three step process is required to form the interior trim component. Such processes, which typically include the steps of forming the laminate, separately injection molding the interior of the component, and attaching the laminate to the interior of the component, are inefficient and costly.

Additionally, when the interior of the component is separately formed and the laminate is subsequently attached to the interior, any space between the laminate and the interior allows the laminate to expand or contract under the temperatures that are realized in a passenger compartment of a vehicle or truck. For example, the passenger compartment can realize temperatures above 79 degrees C. in summer months, resulting in considerable expansion of the laminate and undesirable slack between the laminate and the interior. On the other hand, in winter months, the passenger compartment can realize temperatures well below 0 degrees C., resulting in considerable contraction of the laminate and undesirable tears, or other defects, in the laminate.

Furthermore, it is generally understood that if the laminate includes a barrier layer, such as in low-pressure injection molding, the barrier layer of the laminate functions to establish a resistive barrier between the interior of the component and the face layer of the laminate so that the interior of the component does not affect the aesthetic, decorative, textile-like appearance of the face layer. The barrier layers utilized in the laminates of the prior art are deficient. For example, in low-pressure injection molding, where the interior of the component may be injection molded, not separate from, but in combination with the laminate, the barrier layers are not heavy enough to prevent the interior of the component, such as a polymer that is being injection molded, from penetrating into the face layer. Furthermore, the types of barrier layers used in low-pressure injection molding cannot withstand the extreme pressures and temperatures associated with high-pressure injection molding where pillars and the like are produced. Accordingly, these particular barrier layers cannot be suitably applied to high-pressure injection molding.

Due to the deficiencies in the interior components and the methods of the prior art, including those described above, it is desirable to provide an interior trim component and a method of forming the interior trim component where the barrier layer functions to adequately prevent the interior of the component from interfering with the decorative appearance of the face layer of the laminate, even in a high-pressure injection molding method. It is also an advantage of the present invention that the laminate is positioned in an injection molding apparatus before the interior of the component is injection molded such that the laminate can bond with a polymer that forms the interior, during the molding method, thereby reducing associated costs of material covering, including labor, while also virtually eliminating any space between the laminate and the interior.

SUMMARY OF THE INVENTION AND ADVANTAGES

An interior trim component and a method of forming the interior trim component are disclosed. The method of forming the interior trim component utilizes an injection molding apparatus. The injection molding apparatus has a first mold tool and a second mold tool. The interior trim component includes a laminate and a polymer. The laminate more specifically includes a face layer, an adhesive layer, and a barrier layer. The face layer has a finished side and an unfinished side, and the adhesive layer is bonded to the unfinished side of the face layer. The barrier layer, which is bonded to the adhesive layer, comprises a non-woven textile weighing at least 80 $g/m^2$. The polymer is reactive with the barrier layer of the laminate such that the laminate is bonded to the polymer without the polymer penetrating through the barrier layer and into the face layer.

The method more specifically includes the step of positioning the laminate in the first mold tool. As a result, the barrier layer of the laminate is exposed to face the second mold tool. Once the laminate is positioned in the first mold tool, one of the first and second mold tools is moved toward the other of the first and second mold tools such that the injection molding apparatus is in a closed position. In the closed position, a cavity is established between the barrier layer and an inner surface of the second mold tool. The polymer is then injected into the cavity at an injection pressure of at least 500 psi. Once in the cavity, the polymer reacts with the barrier layer to bond the laminate to the polymer and form the interior trim component. The barrier layer prevents the polymer from penetrating through the barrier layer and into the face layer.

Accordingly, the subject invention provides an interior trim component and a method of forming the interior trim component where the barrier layer functions to adequately prevent the interior of the component from interfering with the decorative appearance of the face layer of the laminate, even in high pressure injection molding.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a cross-sectional side view of a laminate according to the subject invention illustrating a face layer, an adhesive layer, and a barrier layer;

FIG. 1B is an exploded cross-sectional side view of the laminate of FIG. 1A;

FIG. 2A is a cross-sectional side view of an injection molding apparatus having a first mold tool and a second mold tool with the laminate positioned in the first mold tool such that the barrier layer is exposed to face the second mold tool;

DETAILED DESCRIPTION OF THE PREFERRED EMBODIMENT

Figure 2B:
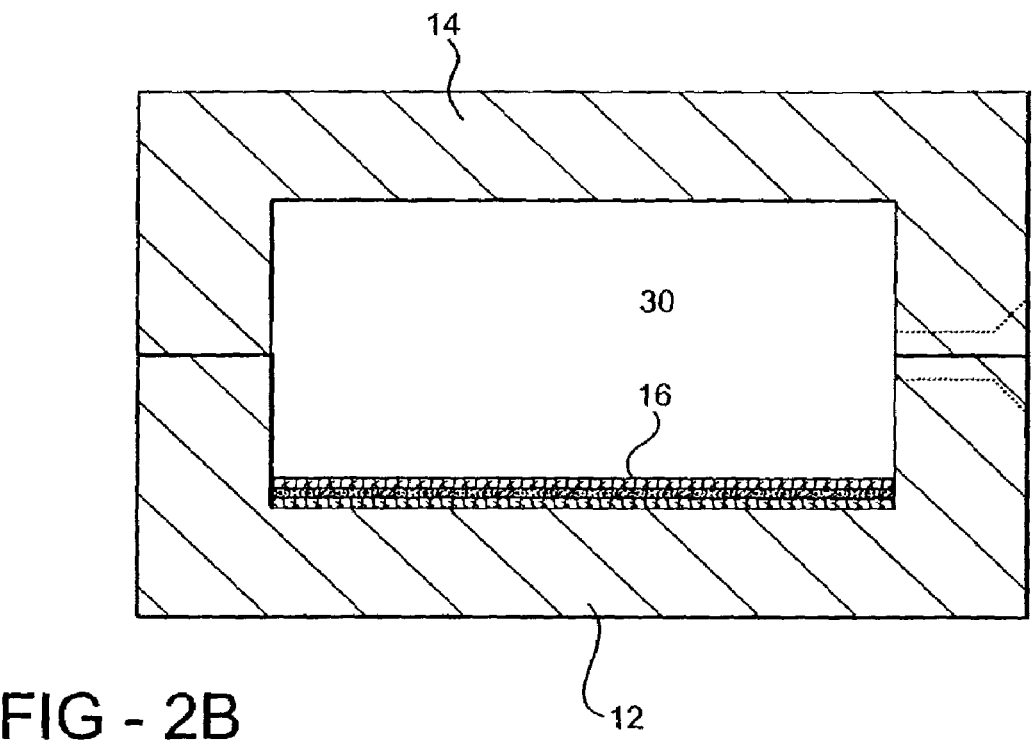
FIG. 2B is a cross-sectional side view of the injection molding apparatus of FIG. 2A in a closed position such that a cavity is established.

Referring to the Figures, wherein like numerals indicate like or corresponding parts throughout the several views, an interior trim component, or part, is generally disclosed at 10. The method of forming the interior trim component 10 utilizes an injection molding apparatus having a first mold tool 12 and a second mold tool 14. As disclosed in the Figures, the first mold tool 12 is arranged as a lower mold tool and the second mold tool 14 is arranged as an upper mold tool. However, this arrangement is not critical to the subject invention. For instance, the opposite may be true. The first mold tool 12 may be arranged as an upper mold tool and the second mold tool 14 may be arranged as a lower mold tool. Furthermore, the first and second mold tools 12, 14 may be arranged as right and left mold tools, or vice versa. Various injection molding apparatuses known to those skilled in the art may be utilized and only the first and second mold tools 12, 14 of the injection molding apparatus are disclosed in the Figures. The interior trim component 10 formed according to the method of the subject invention is formed in high-pressure injection molding methods and is utilized as a headliner or a pillar, such as an A, B, C, or D pillar, of a passenger compartment of a vehicle or truck. It is most preferred that the interior trim component 10 is an A pillar formed in a high-pressure injection molding method.

The interior trim component 10 comprises a laminate 16 and a polymer 18. The polymer 18 is described below. Referring primarily to FIGS. 1A and 1B the laminate 16 comprises a face layer 20, an adhesive layer 22, and a barrier layer 24. The face layer 20 has a finished side 26 and an unfinished side 28, and the adhesive layer 22 is bonded to the unfinished side 28 of the face layer 20. The barrier layer 24 is bonded to the adhesive layer 22.

Preferably, the face layer 20 of the laminate 16 is selected from the group consisting of polyester warp knits, circular knits, non-woven polyesters, non-woven polypropylenes, rashel fabrics, nylon, and combinations thereof. Alternatively, the face layer 20 may comprise any other material that is suitable for a headliner or a pillar. Since the face layer 20 is visible in the passenger compartment, allowing customers to choose from a wide range of materials best suits each customer's own personal preference.

The adhesive layer 22 comprises a thermoplastic adhesive in a powder, adhesive web, or adhesive film form. Additionally, a heat- and humidity-reactive hot melt can be used in a powder, granule, or pellet form. While the preferred embodiment employs a web adhesive weighing approximately 16 g/m$^2$, any other appropriate adhesive may be selected provided that the adhesive offers a high viscosity, heat resistance, and melting point. Since, as described below, the injection step occurs at high temperatures, an adhesive having a viscosity, heat resistance, or melting point that is too low risks being reactivated during the injection process which is undesirable.

The barrier layer 24 of the laminate 16 comprises a non-woven textile weighing at least 80 g/m$^2$. Preferably, the non-woven textile weighs from 80 to 250 g/m$^2$, and in the most preferred embodiment of the subject invention, the non-woven textile weighs from 140 to 160 g/m$^2$. The weight of the barrier layer 24 is indicative of the ability of the barrier layer 24 to prevent the polymer 18 from penetrating through the barrier layer 24. The barrier layer 24 is felt-like. One suitable barrier layer 24 is commercially available from FILC d. d. Menges of Slovenia as "Barrier/Non-Woven."

The non-woven textile may be selected from the group consisting of needled fleece, polyester fibers, polypropylene fibers, foam, and combinations thereof. The non-woven textile may also be a thermostable cushion. However, in the most preferred embodiment of the subject invention, the non-woven textile is needled fleece having a weight of 150 g/m$^2$. Any suitable non-woven textile is preferably needle punched to achieve the functions of the barrier layer 24. It is also possible that the barrier layer 24 also include a barrier film.

As described additionally below, due to its weight, the barrier layer 24 prevents the polymer 18, upon and during injection, from penetrating into the face layer 20. Keeping the polymer 18 away from the face layer 20 ensures that the face layer 20 maintains a decorative, textile-like appearance. Additionally, the barrier layer 24 functions to allow the polymer 18 to securely attach to the laminate 16.

The method of the subject invention includes the step of forming the laminate 16 utilizing a laminator, preferably a flat-bed laminator not shown in the Figures, before the laminate 16 is positioned in the first mold tool 12. The step of positioning the laminate 16 in the first mold tool 12 is described subsequently below. As understood by those skilled in the art, various types of laminators may be used depending on the materials used for the face layer 20, the adhesive layer 22, and the barrier layer 24. The face layer 20, the adhesive layer 22, and the barrier layer 24 are assembled in the laminator. Alternatively, the face layer 20, the adhesive layer 22, and the barrier layer 24 can be assembled and then place into the laminator. For example, the individual layers may be assembled and then fed into the laminator via a conveyor. Once assembled and in the laminator, the face layer 20, the adhesive layer 22, and the barrier layer 24 are fused to form the laminate 16.

If, for example, the laminator is the flat-bed laminator, then the face layer 20, the adhesive layer 22, and the barrier layer 24 are assembled on a tray of the flat-bed laminator. A press of the flat-bed laminator then causes the layers to be fused under increased pressure. Of course, during this fusion step, the flat-bed laminator is activated to heat the layers and then undergoes a cooling process to form the complete laminate 16. Typical ranges of settings for flat-bed laminators include 250 degrees Fahrenheit to 350 degrees Fahrenheit for temperature applied during the heating process, 10 seconds to 30 seconds dwell time, and 10 psi to 50 psi for pressure applied during the laminating process. The cooling process uses 38 degrees Fahrenheit to 55 degrees Fahrenheit as the temperature for cooling water in a cooling zone of the flat-bed laminator as part of the cooling process.

The method also includes the step of die-cutting the laminate 16 after the laminate 16 has been formed, i.e., assembled and fused. The laminate 16 may be die-cut to precisely fit the mold tools 12, 14. Alternatively, the laminate 16 may be placed directly into the mold tools 12, 14, without die-cutting, and then cut after forming of the interior trim component 10.

Once the laminate 16 is formed, the method of the subject invention includes the step of positioning the laminate 16 in the first mold tool 12 such that the barrier layer 24 is exposed to face the second mold tool 14. This step is represented in FIG. 2A. Referring now to FIG. 2B, once the laminate 16 is positioned in the first mold tool 12, one of the first and second mold tools 12, 14 is moved toward the other of the first and second mold tools 12, 14. As such, the injection molding apparatus is in a closed position and a cavity 30 is established between the barrier layer 24 and an inner surface of the second mold tool 14. It is to be understood that the mold tool that moves to place the injection molding apparatus in the closed position is not critical to the subject invention. For instance, in the Figures, the second mold tool 14 moves toward the first mold tool 12 to place the injection molding apparatus in the closed position. However, the opposite may be true. That is, the first mold tool 12 may move upwardly toward the second mold tool 14 to place the injection molding apparatus in the closed position. In fact, in certain embodiments, both the first and second mold tools 12, 14 may move toward one another to place the injection molding apparatus in the closed position.

Figure 2C:
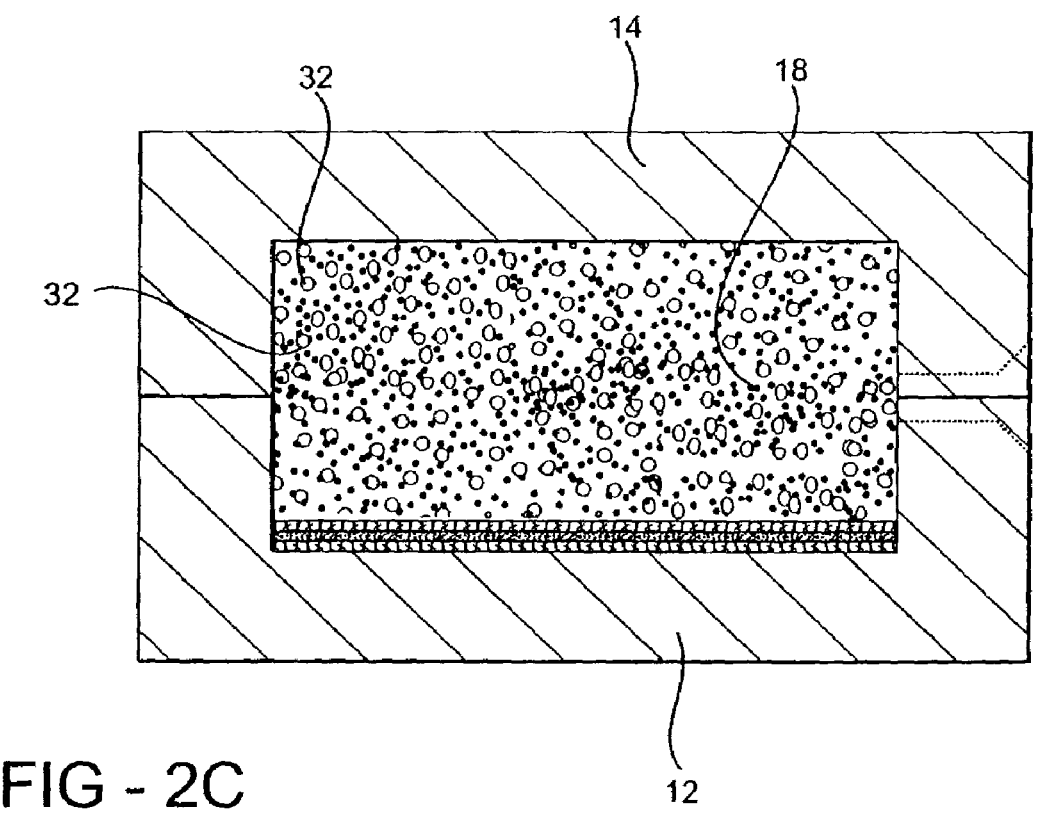
FIG. 2C is a cross-sectional side view of the injection molding apparatus of FIG. 2B with a polymer being injected into the cavity.

Referring now to FIG. 2C, the polymer 18 is injected into the cavity 30 at an injection pressure of at least 500 psi. More preferably, the polymer 18 is injected into the cavity 30 at injection pressures ranging from 500 to 2500 psi. Furthermore, it is preferred that the polymer 18 is injected into the cavity 30 at an injection temperature of from 350 to 575° F. Other settings applied to the first and second mold tools 12, 14 vary, as known to those skilled in the art, based on the particular type of injection molding apparatus and also on the type of polymer 18 and laminate 16. However, preferable these other settings are a cycle time of from 10 seconds to 3.5 minutes and a clamp pressure of from 20 to 5,000 tons.

The polymer 18 is selected from the group consisting of ABS, polycarbonate, nylon, polypropylene, and combinations thereof. Alternatively, the polymer 18 may be any other material suitable for automotive interior applications and capable of being injection molded. Additionally, it is possible that a fiber 32 may be disposed in the polymer 18 to reinforce, and otherwise strengthen, the polymer 18.

Once injected into the cavity 30, the polymer 18 reacts with the barrier layer 24 to bond the laminate 16 to the polymer 18 and form the interior trim component 10 of the subject invention without the polymer 18 penetrating through the barrier layer 24 and into the face layer 20. That is, during and throughout the injection of the polymer 18, the barrier layer 24 prevents the polymer 18 from interfering with the face layer 20 of the laminate 16. The polymer 18 bonds with the laminate 16 as the polymer 18 and laminate 16 cool. This bond secures the laminate 16 to the polymer 18 to form the interior trim component 10.

Figure 3A:
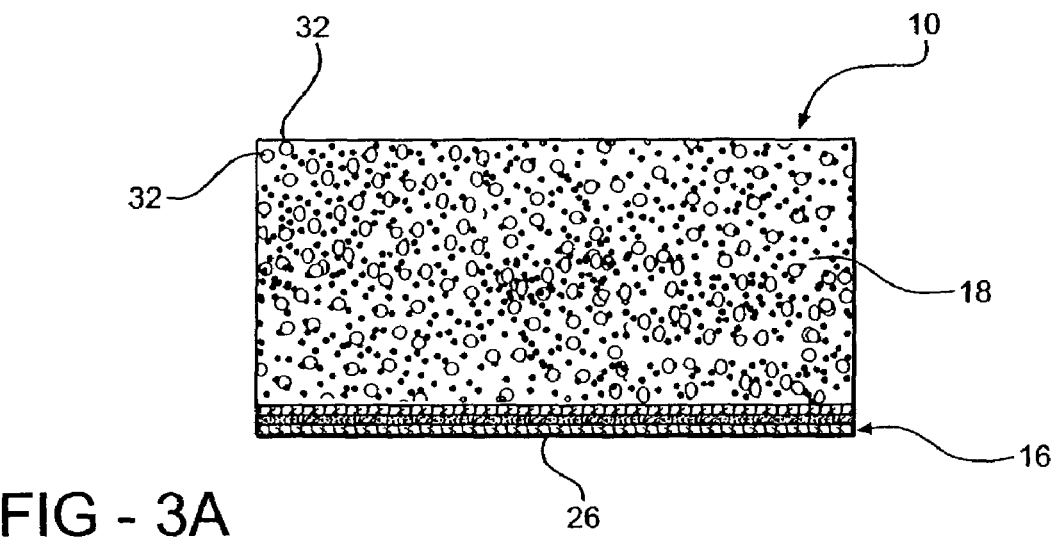
FIG. 3A is a side view of an interior trim component formed in the injection molding apparatus of FIG. 2C.
Figure 3B:
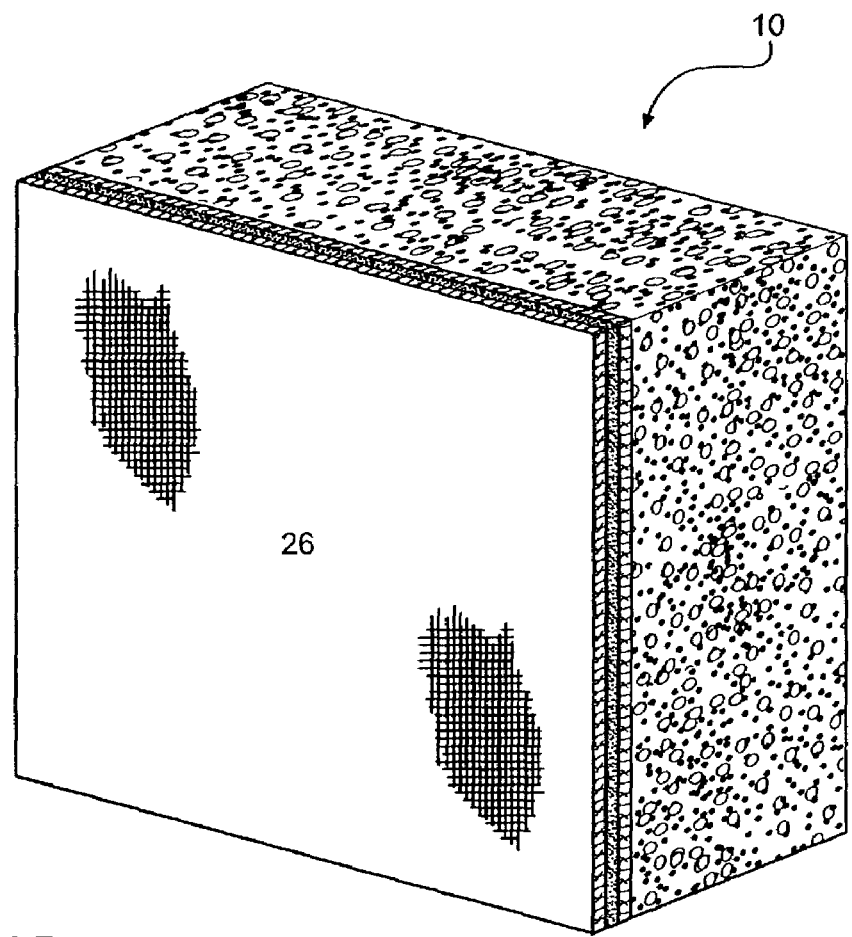
FIG. 3B is a perspective view of the interior trim component of FIG. 3A.

Referring now to FIGS. 3A and 3B, following the injection of the polymer 18, the interior trim component 10 is removed from the first and second mold tools 12, 14 with the laminate 16 automatically and securely bonded to the polymer 18. The side and perspective views of FIGS. 3A and 3B, respectively, show that only the face layer 20 is visible where the mold is bonded with laminate 16. In this embodiment, opposite the face layer 20, the polymer 18 is exposed.

Figure 4A:
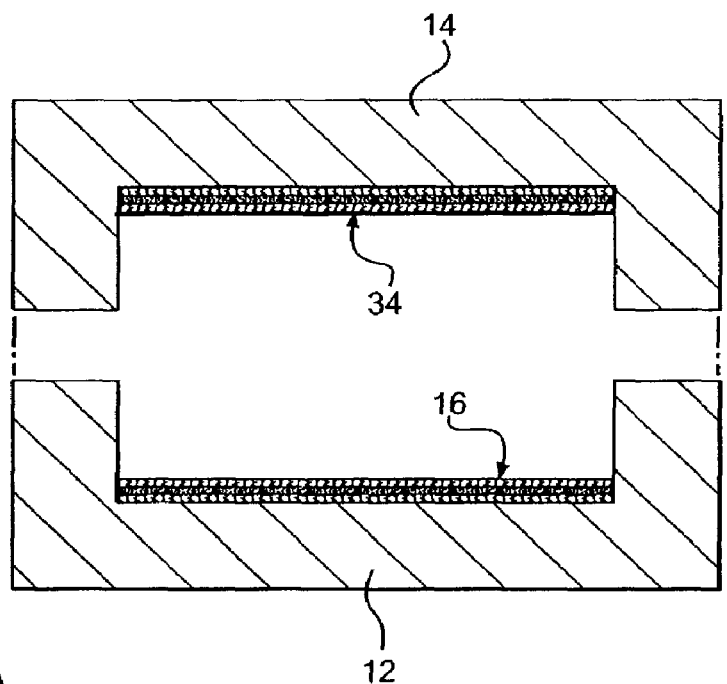
FIG. 4A is a cross-sectional side view of the injection molding apparatus with the laminate positioned in the first mold tool and a second laminate positioned in the second mold tool such that a barrier layer of the second laminate is exposed to face the barrier layer of the laminate in the first mold tool.
Figure 4B:
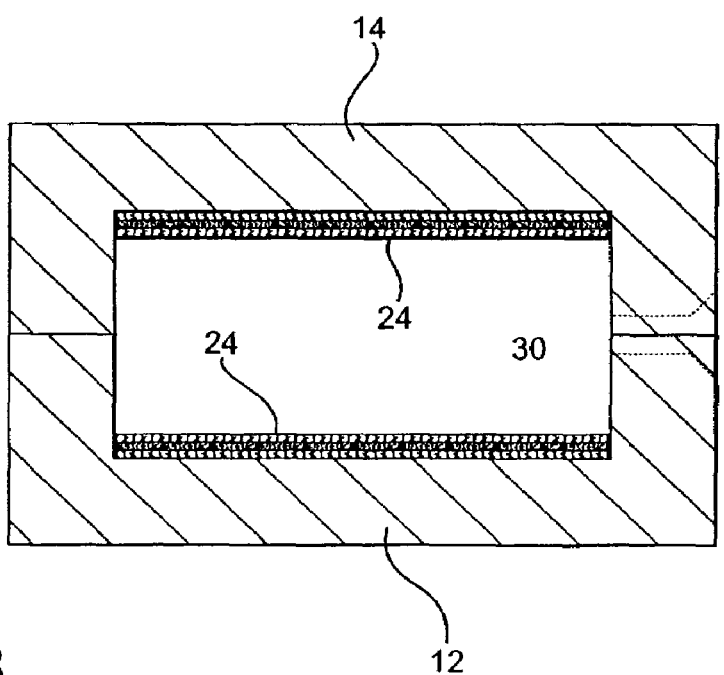
FIG. 4B is a cross-sectional side view of the injection molding apparatus of FIG. 4A in the closed position such that the cavity is established between the barrier layer of the second laminate in the second mold tool and the barrier layer of the laminate in the first mold tool.
Figure 4C:
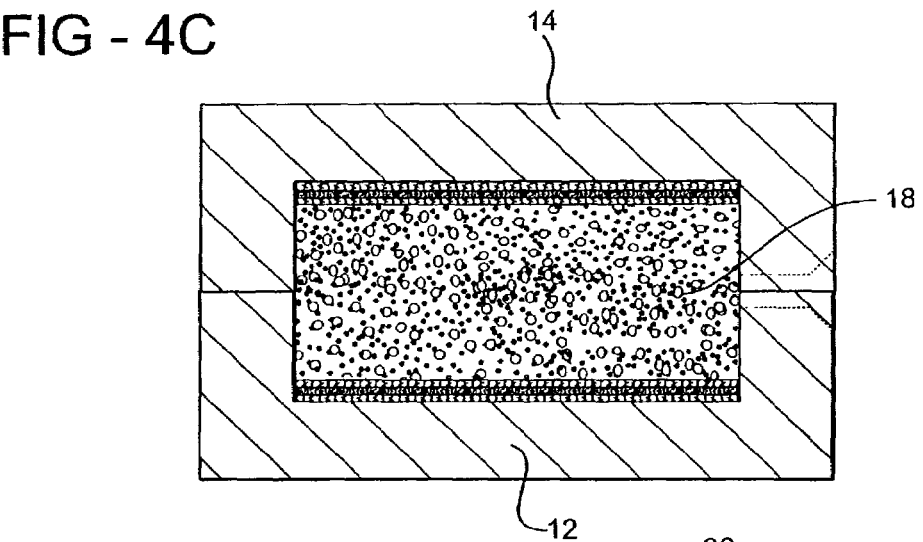
FIG. 4C is a cross-sectional side view of the injection molding apparatus of FIG. 4B with the polymer being injected into the cavity.

Referring now to FIGS. 4A through 4C, the interior trim component 10 may further comprise a second laminate 34. Although the second laminate 34 is not required, it is most preferred that if the second laminate 34 is included, then it is identical to the laminate 16 such that the second laminate 34 also has a face layer 20, an adhesive layer 22, and a barrier layer 24. As a result, the barrier layer 24 of the second laminate 34 also comprises a non-woven textile weighing at least 80 g/m².

As disclosed specifically in FIG. 4A, the method includes the step of positioning the second laminate 34 in the second mold tool 14 such that the barrier layer 24 of the second laminate 34 is exposed to face the barrier layer 24 of the laminate 16 in the first mold tool 12. As such, in this embodiment and as disclosed in FIG. 4B, the cavity 30 is now established between the barrier layer 24 of the second laminate 34 in the second mold tool 14 and the barrier layer 24 of the laminate 16 in the first mold tool 12 when the injection molding apparatus is in the closed position. Referring particularly to FIG. 4C, the polymer 18 is injected into the cavity 30 such that the polymer 18 reacts with both barrier layers 24 to bond both the laminate 16 and the second laminate 34 to the polymer 18 and form the interior trim component 10 having laminates 16 on both its sides. In this embodiment, both of the barrier layers 24 prevent the polymer 18 from penetrating through the barrier layers 24 and into the face layers 20.

Figure 5A:
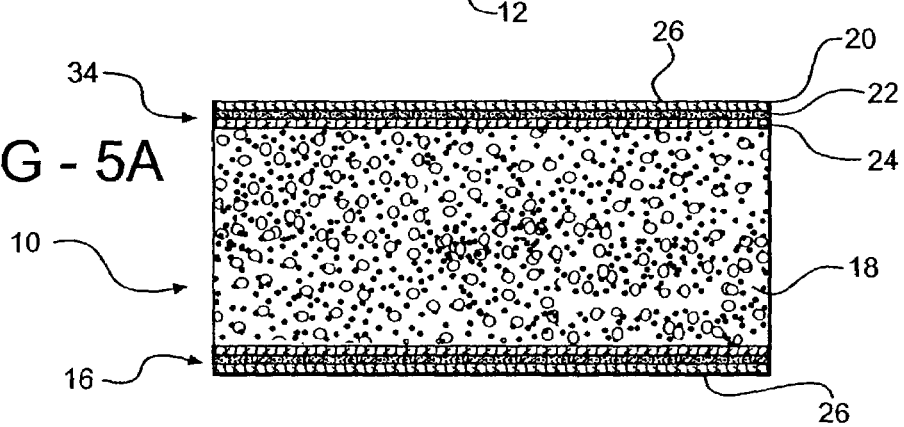
FIG. 5A is a side view of an interior trim component formed in the injection molding apparatus of FIG. 4C having the laminate and the second laminate.
Figure 5B:
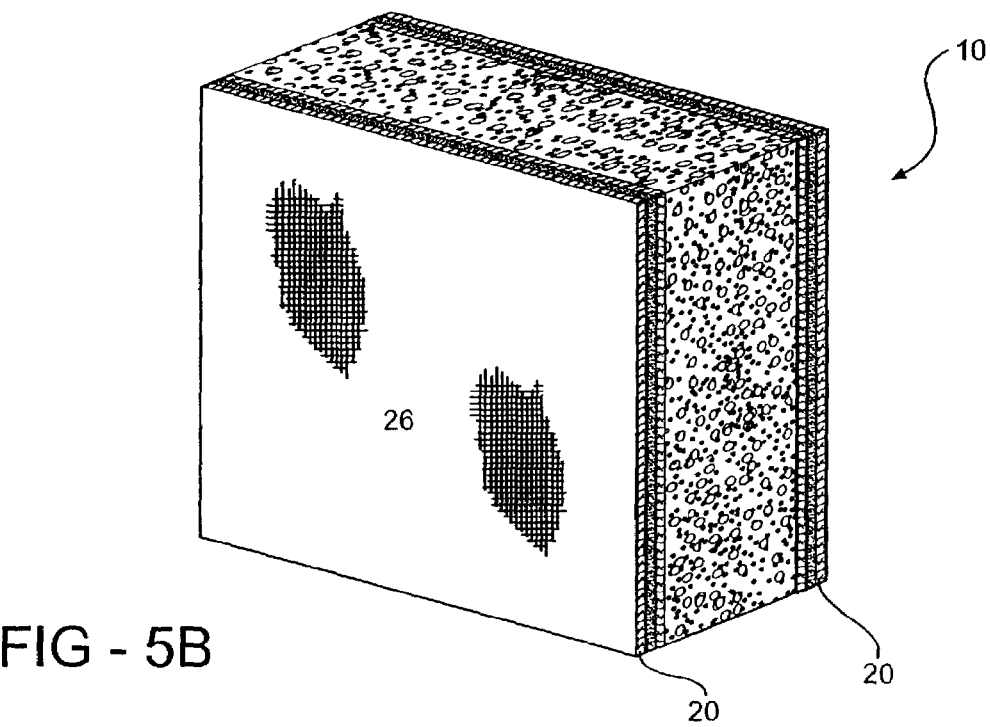
FIG. 5B is a perspective view of the interior trim component of FIG. 5A.

Referring now to FIGS. 5A and 5B, following the injection of the polymer 18, the interior trim component 10 is removed from the first and second mold tools 12, 14 with both the laminate 16 and the second laminate 34 automatically and securely bonded to the polymer 18. The side and perspective views of FIGS. 5A and 5B, respectively, show that only the face layer 20 of the laminate 16 is visible where the mold is bonded with laminate 16 and only the face layer 20 of the second laminate 34 is visible where the mold is bonded with the second laminate 34. The interior trim component 10 of this embodiment includes decorative face layers 20 on both of its sides.

The advantages of the present invention can now be recognized. The laminate 16 may be used in both high-pressure and low-pressure injection molding methods. In addition, the laminate 16 may be used in injection molding methods of polymers 18 with blowing or expanding additives, such as MUCELL. This versatility, in conjunction with a method requiring less steps where the laminate 16 does not have to be separately stitched or otherwise secured to the polymer 18, results in a manufacturer cost savings. Additionally, by fusing the polymer 18 with the laminate 16, it is unlikely that the laminate 16 will become too loose or too taut during normal use, i.e., various temperatures. The use of the face layer 20 strengthens this outcome.

Aesthetically, a versatile choice for the face layer 20 allows the customer to choose a material most pleasing to their tastes. By color matching the face layer 20 to the barrier layer 24, a nick or a scratch in the face layer 20 reveals only the same-colored barrier layer 24 underneath, minimizing the impact of nicks and scratches on the appearance of a vehicle interior. Additionally, a color chosen for the barrier layer 24 can function to intensify or mute the color of the face layer 20 if the face layer 20 is thin enough for the barrier layer 24 to show through. Many variations are possible regarding layer thicknesses as well. A thin face layer 20 can be paired with a thick barrier layer 24. Conversely, a thick face layer 20 may allow for a lighter barrier layer 24. If both the face layer 20 and the barrier layer 24 chosen are heavy, the resulting laminate 16 will likely have a soft touch feel which may be desirable to some customers.

It can thus be seen that the subject invention provides an interior trim component 10 and a method of forming the interior trim component 10 where the laminate 16 is positioned into the injection molding apparatus prior to injection of the polymer 18 such that the laminate 16 bonds with the polymer 18 molding, i.e., during the injection step. Therefore, associated costs, including labor, of covering the polymer 18 with the laminate 16 are reduced and any space between the laminate 16 and the polymer 18 is virtually eliminated.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that reference numerals are utilized merely for convenience and are not to be limiting in any way, and that the invention may be practiced otherwise than as specifically described.

What is claimed is:

1. A method of forming an interior trim component utilizing an injection molding apparatus having a first mold tool and a second mold tool, said method comprising the steps of:
   positioning a laminate comprising a face layer, an adhesive layer bonded to the face layer, and a barrier layer bonded to the adhesive layer in the first mold tool such that the barrier layer is exposed to face the second mold tool, wherein the barrier layer comprises a non-woven textile weighing at least 140 g/m$^2$;
   moving one of the first and second mold tools toward the other of the first and second mold tools such that the injection molding apparatus is in a closed position and a cavity is established between the barrier layer and an inner surface of the second mold tool; and
   injecting a polymer into the cavity at an injection pressure of at least 500 psi wherein the polymer reacts with the barrier layer to bond the laminate to the polymer and form the interior trim component without the polymer penetrating through the barrier layer and into the face layer.

2. A method as set forth in claim 1 wherein the step of injecting the polymer into the cavity is further defined as injecting the polymer into the cavity at an injection pressure of from 500 to 2500 psi.

3. A method as set forth in claim 1 wherein the step of injecting the polymer into the cavity is further defined as injecting the polymer into the cavity at an injection temperature of from 350 to 575° F.

4. A method as set forth in claim 1 further comprising the step of forming the laminate utilizing a laminator prior to positioning the laminate in the first mold tool.

5. A method as set forth in claim 4 further comprising the step of die-cutting the laminate after the laminate has been formed.

6. A method as set forth in claim 4 wherein the step of forming the laminate comprises the step of assembling the face layer, the adhesive layer, and the barrier layer in the laminator.

7. A method as set forth in claim 6 wherein the step of forming the laminate further comprises the step of fusing the face layer, the adhesive layer, and the barrier layer in the laminator after these layers have been assembled.

8. A method as set forth in claim 7 further comprising the step of die-cutting the laminate after the laminate has been assembled and fused.

9. A method as set forth in claim 1 wherein the interior trim component further comprises a second laminate, and the method further comprises the step of positioning a second laminate in the second mold tool such that a barrier layer of the second laminate is exposed to face the barrier layer of the laminate in the first mold tool.

10. A method as set forth in claim 9 wherein the cavity is established between the barrier layer of the second laminate in the second mold tool and the barrier layer of the laminate in the first mold tool when the injection molding apparatus is in the closed position, and the step of injecting the polymer into the cavity is further defined as injecting the polymer into the cavity such that the polymer reacts with both barrier layers to bond both the laminate end the second laminate to the polymer and form the interior trim component without the polymer penetrating through the barrier layers.

* * * * *